(12) United States Patent
Massaro (10) Patent No.: US 6,543,688 B1
(45) Date of Patent: Apr. 8, 2003

(54) ELECTRONIC DISPLAY FOR STORE SHELVES

(76) Inventor: Michael J. Massaro, 329 Bradford La., Lansdale, PA (US) 19446

(\*) Notice: Subject to any disclaimer, the term of this patent is extended or adjusted under 35 U.S.C. 154(b) by 107 days.

(21) Appl. No.: 09/664,711

(22) Filed: Sep. 19, 2000

(51) Int. Cl.$^7$ ............................................... G06K 15/00
(52) U.S. Cl. ....................... 235/383; 235/385; 235/441
(58) Field of Search ................................ 235/383, 385, 235/441

(56) References Cited

PUBLICATIONS

Encyclopedia of Electronics, 2$^{nd}$ Ed. Gibilisco and Sclater, 1990. "Multiplex".*

\* cited by examiner

Primary Examiner—Karl D. Frech
Assistant Examiner—Daniel A. Hess
(74) Attorney, Agent, or Firm—Gregory J. Gore (57) ABSTRACT

A system for electronically displaying item data information such as item prices and item descriptions that is available in updatable form from a central buffer, processing, multiplexing and serving unit. The system provides a multi-frequency tone signal containing item data applicable to an item on a shelf associated with an electronic display module and containing the address code of that particular module. The electronic display module responds to its particular address code and receives, decodes, and displays the data relating to the item. It further includes a multi-frequency tone signaling system to retransmit the received data to the server unit as a means of confirming that the proper information had been received and displayed. Item data information is routed, distributed, and transferred through the use of multiplexed signal buses. The central buffer, processing, multiplexing and serving unit receives product description and pricing data information from the store central computer and processes this information for transmission to the display modules. It also maintains records of the status of all display modules including those display modules that cannot be accessed or reprogrammed and records of all successful and unsuccessful item information updates.

27 Claims, 9 Drawing Sheets

ELECTRONIC DISPLAY FOR STORE SHELVES

FIELD OF THE INVENTION

The present invention relates to the electronic storage, control, and display of information on a shelf-mounted price tag. More specifically, it relates to electronic price tags which communicate with a central store computer and point of sale computers.

BACKGROUND OF THE INVENTION

A large supermarket may have as many as thirty-five thousand (35,000) different items for sale. The items are generally arranged on shelves. Price tags are generally disposed below the items on the front of the shelves that are providing the support for the items. Most store shelves have an edge channel into which the tags are placed. The tags are generally passive, that is; they are prepared in advance and are affixed to the front of the shelves inside of the shelf edge channel. The tags may be made from a suitable material such as cardboard or plastic and may be affixed to the shelves in a manner such that they can be easily removed from the shelves. The information on the tags may be typed or printed. This information may include the identity of the item, the supplier's or the stores trademark for the item, the price of the item, the price per unit quantity (e.g. price per ounce or price per fluid unit or price per pound), any discount from a previously established price, or a special sales price.

It has been estimated that approximately 10% of the prices of a store's inventory are changed weekly to reflect cost variations. Perhaps another 10% of the prices may be changed so as to reflect sales specials, and then changed back again when the sale event is terminated. For the most part, such price changes are effected on overtime, or at least when the store is closed to normal business. Further, since auditing a price ordinarily must be accomplished with the aid of a printed book, it is next to impossible to maintain computer prices (the scanned prices) synchronous with book prices.

It is not uncommon to change the price of an item in the central processing unit in the market and to forget to change the price on the tag identifying the item on the store shelf This creates confusion, particularly at the cashier's counter, in the operation of the supermarket and sometimes resentment in the minds of the customers. Often the supermarket may have to provide the customer with the price indicated on the tag even though the true price indicated in the supermarket's central processing unit is higher than such indicated price.

Passive tags on shelves as discussed above have vast acceptance because of its apparent low cost and because of its widespread use over a considerable number of years. The apparent low cost, however, must be factored against the labor costs associated with the preparation of the new tags and the costs in removing the outdated tags from the shelves, and in affixing the updated tags to the shelves. For large supermarkets, the services of a clerk on a full time basis are often required to accomplish the above tasks.

Various attempts have been made to replace the passive system to updating tags as discussed above with an active system. In these active systems there has been a computer-based means of changing pricing information and electronic display means or electronic product tag, which are computer controlled. Some systems have used a wireless radio frequency (RF) broadcast medium, for at least part of the communications link between the point-of-sale, the store computer, and the electronic display units on the shelves. Other wireless media have included infrared broadcast or handheld infrared transmitting devices. In all cases, the display device itself has either been powered by battery or by use of photovoltaic cells (solar cells).

Many such systems are described in prior art patents, such as U.S. Pat. No. 4,766,295, dated Aug. 23, 1988, which describes the use of battery operated display tags and wireless control of the tags. The tags respond to remotely transmitted signals from overhead transmitters using infrared energy. A hand held unit using the same signaling structure is used to change price tags manually. U.S. Pat. No. 5,465,085, dated Nov. 7, 1995, discloses the use of wireless, remotely controlled electronic product display tags that are powered by photovoltaic cells (solar cells). The tags are controlled by wireless means using overhead infrared transmitters to up-date or change displayed information.

U.S. Pat. No. 4,002,886, dated Jan. 11, 1977, describes the use of electronic display modules that are directly connected to the store main computer and every display unit in the store has its own separate internal address code. The means of connecting the computer to the display tags is by the use of a separate enclosed bus strip that is affixed to every shelf edge.

U.S. Pat. No. 4,139,149, dated Feb. 13, 1979, presents a system in which the electronic display tags do not have an internal address code. The display modules are connected directly to the central store computer and all units are in series with each other. The computer transmits a continuous serial data stream to all of the display units. The computer sends signals conveying the data for each display unit in the same order as the display units are connected to each other.

U.S. Pat. No. 5,374,815, dated Dec. 20, 1994, shows the use of display modules without the need for internal address codes. Display modules are directly connected to a computer. Modules are located by the computer using a zoning system in combination with an electrical contact system along the length of the display bus, which is attached to the shelf edge. In response to a poll from the central computer for determining any displacement of the label, the latter generates a signal indicative of the combination of terminals electrically connected to the interface. Based on this signal and knowledge of the pattern of the electrical contacts along the interface, the central computer can effectively determine the location of the label on the rail and detect any displacement of same. A separate electronic display bus is needed for every four-foot shelf section at the most and for every vertical layer of shelf for all store shelf rows at the least.

U.S. Pat. 5,111,196, dated May 5, 1992, presents electronic display tag units that are battery powered. A portable, hand-held device is used to reprogram and change the displayed information in each tag. The means for affecting the change is by having the hand-held device make direct electrical contact with the display tag. The portable data terminal is electrically connected to the display module by a multi-terminal connector, whereby electrical contact pins of the connector are aligned for engagement with respective electrical contact strips located at the face of the display module and connected to the memory thereof.

In U.S. Pat. 4,500,580, dated Feb. 19, 1985, the display module is hardwired to the store-based computer, and the computer provides both power and associated data. Each display module has an internal address code. The address code of any of the display units can be changed at its location by the use of a hand-held reprogramming device. The display unit is placed in the hand-held device and its address is changed by using the optical scanner in the fixture to scan the bar code (UPC) of the item of merchandise to which the display unit is to be associated.

U.S. Pat. No. 5,751,257, dated May 12, 1998, describes an electronic tag display system in which the display units are isolated and independent and have neither solar cells nor batteries as a direct power source. The display modules receive power and programming by sweeping a hand-held portable device or "wand" across the distributed contacts of the electronic shelf tag.

In U.S. Pat. No. 5,537,312, dated Jul. 16, 1996, the entire length of a shelf edge is an electronic display system and it is an integral part of the shelf The "rack label" display system is centrally controlled by a computer. All repositioning of the electronic rack labels is performed electronically via the central computer and not physically repositioned like the other systems described herein.

Finally, U.S. Pat. Nos. 5,854,476 and 5,854,475, both dated Dec. 29, 1998, describe an electronic price label (EPL) system in which the electronic display tag is battery operated. Control and programming information is sent by the EPL computer using a wireless transmission means.

Battery-powered solutions offer more operational flexibility because displays may be more randomly placed. However, batteries must periodically be replaced, an objectionable and time-consuming task in a store that may have tens of thousands of batter powered displays. Display units powered by solar cells avoid this problem. However, they cannot be used in store shelf areas with low background light levels. Also, the solar cells may not provide sufficient output power to the display unit during periods of heavy power consumption such as during sales alert signaling.

For systems in which radio waves are used, an FCC license must be obtained for each installation, causing delays in installation. In addition, frequency allocations are becoming difficult to obtain.

For systems using broadcast infrared energy, there have been problems establishing line-of-sight linkage between the sources of the infrared energy and the tags energized by such sources. For example, the infrared sources have generally been overhead, usually at the ceilings of the supermarkets. As a result, there has often been a considerable distance between the infrared sources and the tags, particularly with respect to the tags on the lower shelves. Furthermore, there has been a problem with respect to the line-of-sight linkage between the infrared sources and the tags on the shelves, particularly the tags on the lower shelves. These problems have required high-powered infrared sources to be used and bright responses from the tags to be provided. When batteries have been used to power the tags in such systems that employ infrared energy, the batteries have had short lives in view of the intensity of the infrared energy required. Also, display units powered by solar cells may not provide sufficient power to operate under the above conditions. These disadvantages can be overcome by the use of a hand-held infrared transmitting device or a hand-held device that makes direct electrical contact for the purpose of reprogramming the displayed information. However, this has the disadvantage of being time consuming and labor intensive. As such, each display module to be changed must be physically located and accessed and then reprogrammed by the hand-held transmitting device.

For hard-wired powered systems in which the display module is directly connected to a PC workstation, the cable may have to contain both the power lines and the signal lines used to control the display. To accommodate the needed wires, an extra channel is attached to the existing shelf edge channel. This increases the shelf size making the display more susceptible to damage and increases the complexity of the installation. It also creates operational risks in that many liquids in a store are conductive. Thus a spill can create a short circuit and hence cause a system failure. This arrangement also is inflexible because the electronic displays may only be used where the extra channel is installed and power is available.

Another disadvantage of these active display systems is that the display modules may be microprocessor based and may have high clock rates for operation greater than 10 kHz. In addition, the store computer that they are directly connected to also has high clock rates for processing. In such a system, the digital display modules and the interconnection system to the computer can be classified as computer peripheral devices. As such, the display system connected to the computer, and connection means must meet the Part 15 FCC requirements for computer devices. A further disadvantage of some of these embodiments is the need for every display module in the store to have its independent internal address code. This leads to complicated and complex display devices and thousands of different codes are needed to ensure that every product in the store has its individual address code. Some embodiments require the active participation or interaction of store customers with the display module in order to change the information being displayed. The means for this approach is the use of a switch on the display module that the customer activates to change the displayed information.

As will be seen, the active system described herein advances the state of the prior art and overcomes all or most of the above disadvantages.

SUMMARY OF THE INVENTION

This invention provides a system which overcomes the problems associated with the prior art systems briefly described above and advances the state of the art in store display technology.

The invention provides a system for electronically displaying item data, such as price and item description, for purchaser viewing, wherein the data is available in updateable form from the store main computer via a specially designed electronic display server (herein after referred to as a BUSM). This new system is a modern electronic system in which microprocessor/computer based elements control the display system. The standard shelf display tags are replaced by an electronic display and display bus system. This display bus system is comprised of a printed circuit board, standard type or flex type, with conductors which run in parallel so that contact can be readily made by a display module which is mounted to the printed circuit board. The printed circuit board can be easily and rapidly inserted or fastened into the existing shelf edge channels of standard store shelf sections. This can be accomplished by the use of spring clips, screw adjustable clips, or by standard fasteners. All of the store shelf edge channels will be installed with a printed circuit board electronic bus system.

The display module of the invention is a self-contained unit, which can be installed on the printed circuit board bus system and has a means to make contact with the data and power bus conductors. The electronic bus provides power, data information and remote control of the display module. The display module contains the electronic means to display product information such as prices unit cost quantities, store information such as the store name or owner, a visual alert means such as a flashing light (LED) to indicate that the particular item is on sale, and sales information such as the special sales price, cost savings, and expiration date of sale. The module also has means to store information in the event of a power failure. Each module has the electronic means to have a data bus code or internal address code that is unique to it and only when server information is preceded with its particular address code will the unit respond to the information server and accept the new store display information.

A printed circuit board bus is installed in every shelf edge channel in the store and all of the printed circuit board electronic buses that have been installed in the shelf edge channels are interconnected. All of the shelves on one entire side of a row of shelves are connected together forming one group or segment of the electronic bus distribution system designated as a display bus. Each side of all of the rows of shelves are electrically and electronically independent of each other and each side of each row has its own segment or section designation. One electrical bus feeder supplies each side of a row with operating power and information that is independent of all of the other sides of the other rows. Each side of each store row has a dedicated display bus. All sides of all of the rows of the store shelves are in turn connected to an electronic buffer/server/multiplexer, referred to herein as the BUSM unit. The BUSM is then connected to and receives display information from the store central computer. The BUSM processes the store computer signal and sends the information to the display modules using a specialized signal format. Utilizing the present invention, item descriptions, sales prices, sales alerts, regular prices, and per unit quantity prices can all be added and changed to each display module via the store computer through the BUSM. This eliminates the need to print product description tags, sales tags, pricing, and store name information.

It is therefore an object of the present invention to provide a simple, inexpensive, electronic shelftag with nonvolatile memory that is easily programmable and can display a variety of information while maintaining whatever information is programmed onto it indefinitely until changed by information received from the display server. Another object of the present invention is to provide an electronic tag display system that can be easily installed, inexpensive to operate and one that does not need to meet the strict Part 15 FCC certification requirements of computing devices.

Additional benefits and advantages of the present invention will become apparent to those skilled in the art to which this invention relates from the subsequent description of the preferred embodiments and the appended claims, taken in conjunction with the accompanying drawings.

DETAILED DESCRIPTION OF THE PREFERRED EMBODIMENT

Figure 1:
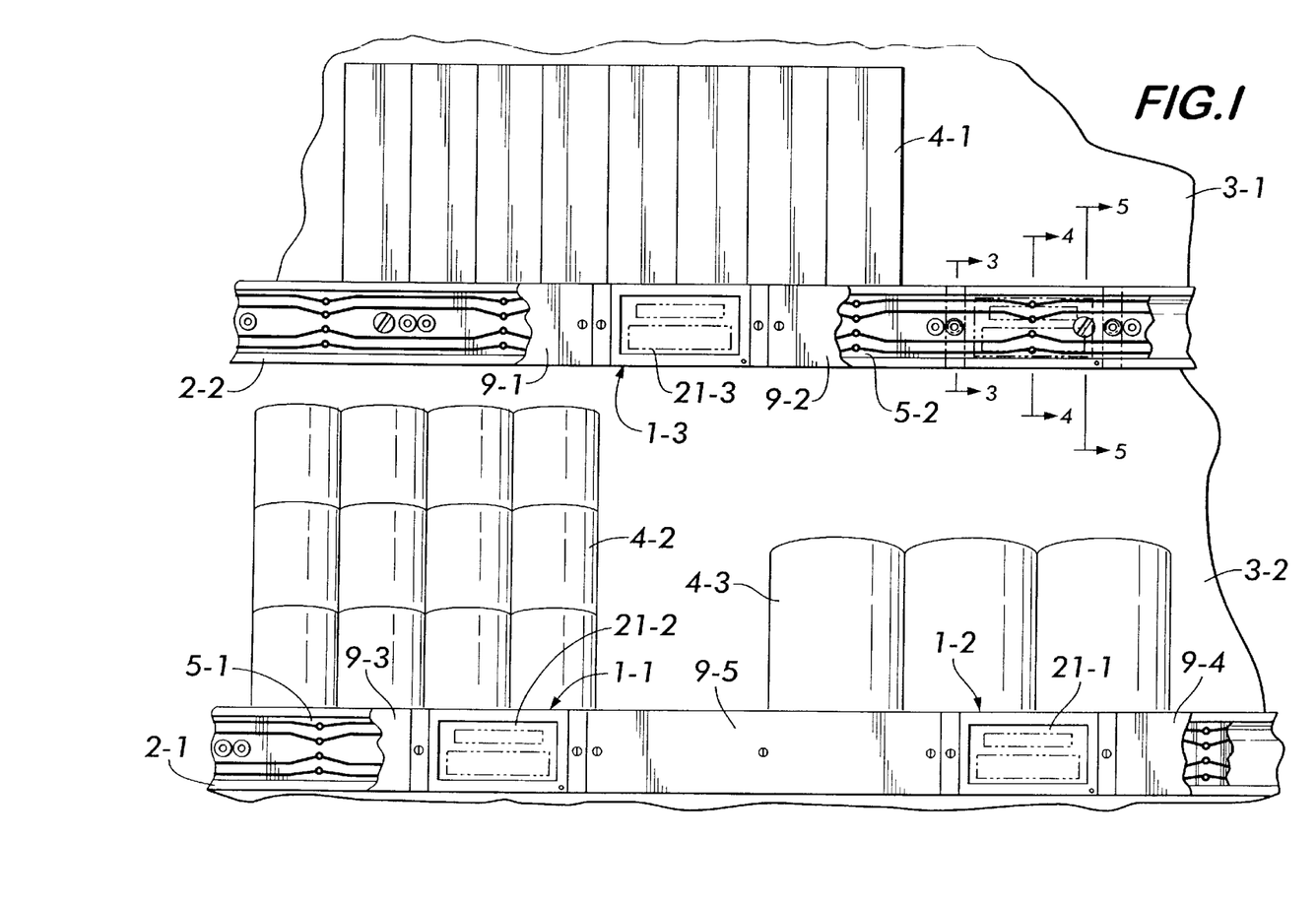
FIG. 1—is the front view of the electronic tag store shelf information display system which forms the present invention.

The independent, stand-alone electronic information display module, which forms part of the present invention, is best described while referring to the drawings. In FIG. 1 there are shown the new electronic display modules 1 mounted in the shelf edge channels 2-1 and 2-2 of store shelf sections 3-1 and 3-2 with dry goods 4-1 and canned goods 4-2 and 4-3. The display modules 1-1, 1-2 and 1-3 are mechanically and electrically connected to printed circuit board buses 5-1 and 5-2. Each item 4 on each shelf section 3 must have a dedicated display module 1 and each module 1 on each shelf side (designated 41 in FIG. 7) will have its individual internal address code. The display module 1 has a sales alert light, LED or similarly bright electronic light, (designated 6 in FIG. 2) to notify customers of a special sales price. In the display windows 21-1, 21-2 and 21-3 there is a product description field (designated 7 in FIG. 2) and product pricing field (designated 8 in FIG. 2) to display pricing information, per unit quantity information, sales price, and sales price saving information. All of this displayed information can be sent to the display module 1 by the store central computer (designated 45 in FIG. 6) through the BUSM unit (designated 39 in FIG. 6) which is described later. In order to conserve and reduce the amount of display elements needed in the display window 21, some or all of the information to be displayed can be displayed on a time-shared basis. That is, several parts of the display window 21 information can be displayed in an alternating fashion. One part can be displayed for a fixed length of time and then the second part can be displayed for a fixed length of time with the display window 21 cycling between them. For example, the cost of the item can be displayed alternately with the per unit cost of the item. This can reduce the size of the display module 1 and its cost. The display window 21 can be tilted or adjusted within the enclosure of the display module 1 to allow an optimum viewing angle depending on its location. For example, display modules 1 mounted on the lower shelf sections 3 can have their display windows 21 adjusted upward. Similarly, display modules mounted on the upper shelf sections 3 can have their display windows 21 adjusted downward. The display window 21 can be adjusted prior to installation in the shelf section 3. The adjustment means is not shown. Because of the uniform spacing of the display modules 1, preformed blank sections 9-1 to 9-5 can be placed between display modules 1 and these blank sections 9 can protect and cover the printed circuit board 5 underneath. In this manner, the printed circuit board bus 5 is not exposed to sight or touch by shoppers. The voltages on the printed circuit board bus 5 will be less than 30 V DC and are safe in the event of accidental human touch.

Figure 2:
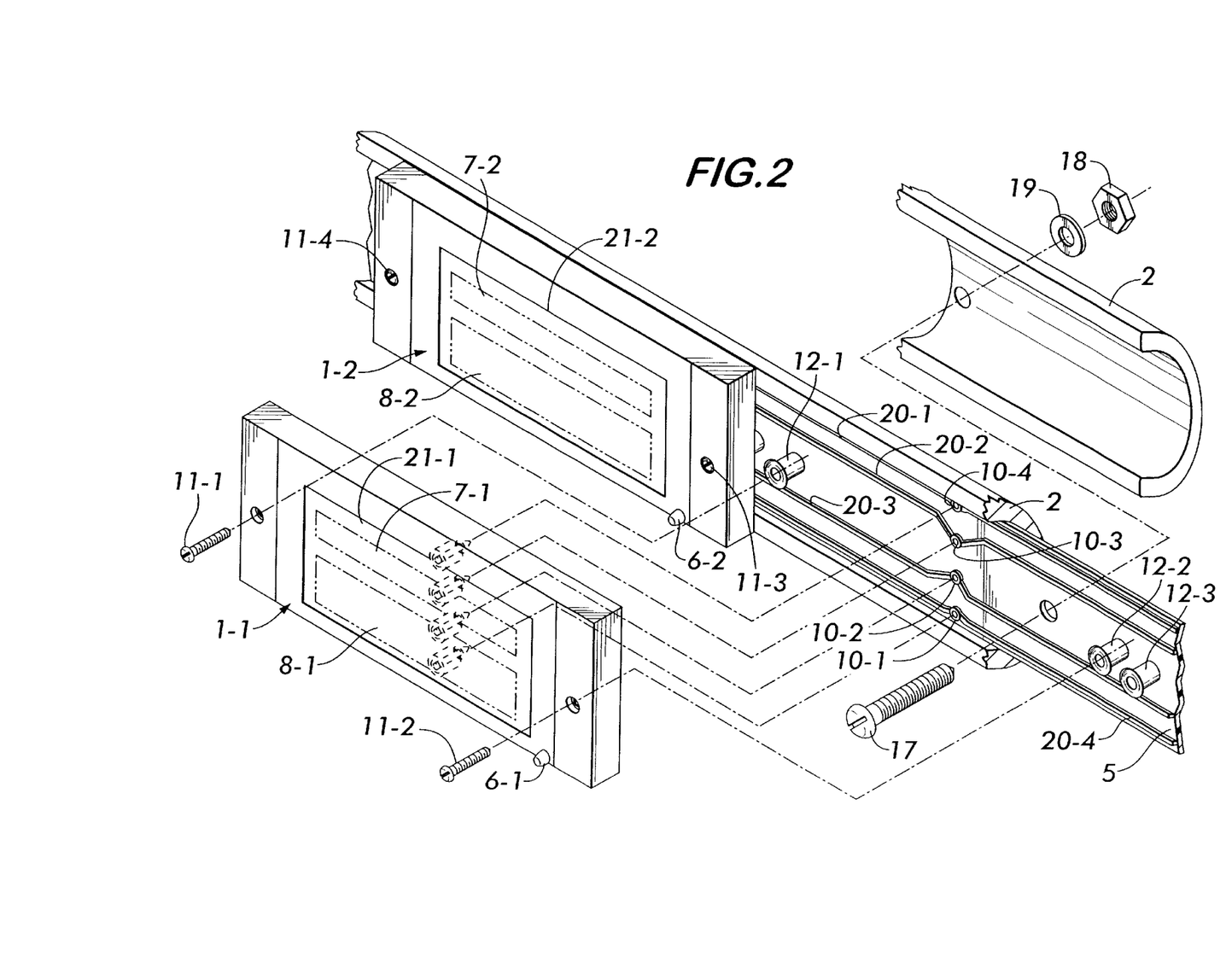
FIG. 2—is a top, right front exploded view of a standard store shelf edge channel showing the electronic display module and the printed circuit board bus that mounts in the shelf edge channel.

In FIG. 2 is an isometric exploded view showing the means by which the electronic display module 1 is attached to the printed circuit board bus 5 and the means by which the printed circuit board bus 5 is attached to the shelf edge channel 2. Also shown is the method by which the display module 1 is mounted and electrically connected to the printed circuit board 5 using the conductive pads 10-1 and 10-4 on the board 5. Each display module 1 has two mounting screws 11-1, 11-2, 11-22 3 and 11-4 whereby it can be attached to the printed circuit board bus 5 that is mounted in the shelf edge channel 2. The printed circuit board 5 has two threaded mounting sockets 12-1 and 12-2 for each display module 1 attached to it. The sockets 12 are uniformly spaced along the length of the printed circuit board 5.

In FIG. 2 the printed circuit board 5 will have the necessary number of conductive traces 20-1 to 20-4 to carry power and data information to the display modules 1. The conductive traces 20-1 to 20-4 can be on the front side (as shown) or the backside of the board 5 and this represents a single-sided board 5. The traces 20-1 to 20-4 can also be on both sides (double-sided) or imbedded in a layer (multi-layer board). Additionally the printed circuit board traces 20 can be covered by a nonconductive masking coating which insulates the traces 20 from fluids, which may spill on the printed circuit board 5. One of the objects of this invention is to have a design which is simple and low cost. The present design can be achieved with a single-sided board 5. In addition, the printed circuit board bus 5 will have mounting sockets 12-1 and 12-2 on the surface to allow the display modules 1 to be easily and rapidly attached and aligned to the circuit board 5. Threaded sockets 12-1 and 12-2 are shown in FIG. 2; however, a small, surface mounted nut-place (not shown) can also be used. In this case, each nut-place is used to mount a different display module 1. The nut plate has the advantage of having a low profile (low height) and can be mounted on either side of the printed circuit board 5.

Each display module 1 is approximately 1.5 to 2.5 inches in length but only about 1.5 inches in height and is positioned on the printed circuit board bus 5 such that its surface perimeter does not extend beyond the existing shelf edge channel 2 either at its top or its bottom. In this manner the display module 1 does not impair or prevent the removal of items 4 from store shelf sections 3 and prevents shelf items 4 from striking and damaging the display module 1 when items 4 are removed. The standard shelf edge channel 2 for non-refrigerated items 4 runs the length of the shelf section 3, is about 1.5 inches in height and is about four feet in length. On the order of 16 to 30 display modules 1 can be mounted in the shelf edge channel 2 of each shelf section 3. The actual number of modules 1 is dependent upon the type of shelf edge channel 3 into which the display modules 1 are mounted and the actual length of the display module 1.

Figure 3:
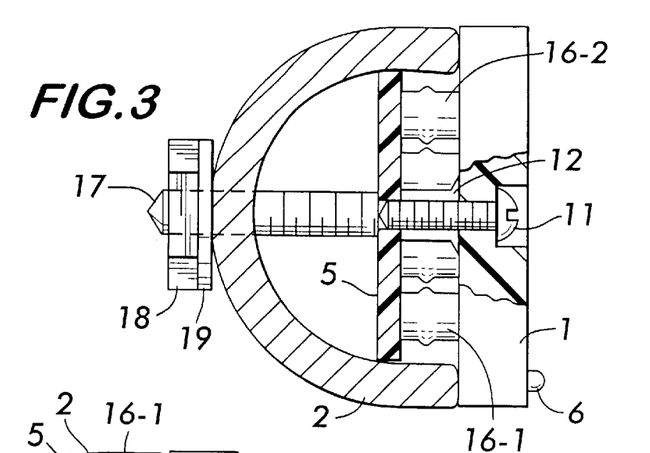
FIG. 3—is a cross-section taken from FIG. 1 showing the details of the means of attaching the display module to the printed circuit board bus.
Figure 4:
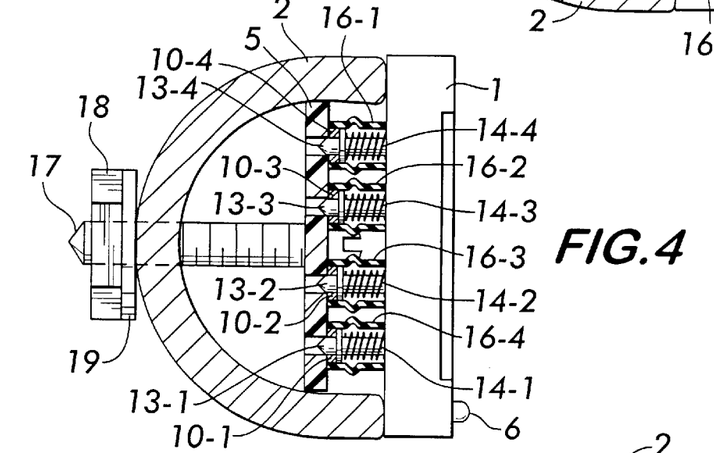
FIG. 4—is a cross-section of FIG. 1 showing the means of electrically connecting the terminals of the display module to the printed circuit board bus.
Figure 5:
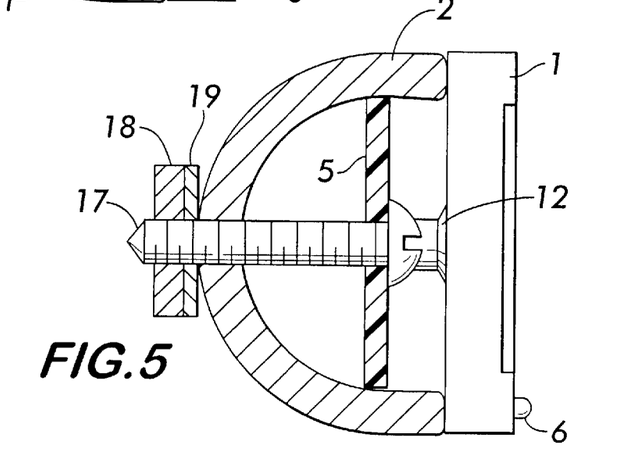
FIG. 5—is a cross-section of FIG. 1 showing one approach to mounting the printed circuit board bus to the shelf edge channel.

The shelf edge channels 2 of the store shelf sections 3 have a cross-section that is crescent in shape. By this means it can accommodate the price, product and sales information tags. The printed circuit board bus 5 of the electronic display system can be mounted inside the crescent area as shown in FIGS. 3, 4 and 5. A printed circuit board bus 5 will be needed for every shelf section 3. The printed circuit board 5 will have several mounting screws 17, nuts 18 and washers 19 that will fasten the bus board 5 to the shelf edge channel 2. FIG. 3 is a cross-section of the shelf edge channel 2, the display module 1 and the printed circuit board bus 5 showing the mounting screw 11 fully seated into the dedicated screw socket 12. FIG. 4 is a cross-section of the shelf edge channel 2, the printed board bus 5, and part of the display module 1 showing the display module 1 guide posts 13-1 to 13-4 engaged in the holes in the printed circuit board bus 5. Each display module 1 has guideposts 13 to allow easy mounting into the printed circuit board bus 5. Around each guidepost 13 is a contact spring 14 which allows electrical contact to conductive pads 10-1 to 10-4 on the circuit board 5. Each guide post 13 and contact spring 14 has a flexible insulating rubber boot 16 surrounding it. The rubber boot 16 protects the conductive pads 10 from shorting-out in those cases in which fluid from broken jars or bottles comes in contact with the display module 1. In FIG. 4 the display module 1 contact springs 14-1 to 14-4 are making electrical connection to the conductive pads 10-1 to 10-4 and the rubber boots 16-1 to 16-4 are compressed and make contact to the printed circuit board 5. FIG. 5 is a cross-section of the shelf edge channel 2 and the printed circuit board bus 5 showing the mounting screw 17 fastened into the channel 2 by the nut 18 and washer 19.

Different types of shelf edge channels (not shown) are used in freezer or cooler shelf sections of stores (not shown). All have grooves to accommodate tags and a similar mounting approach as described above can be used in these different channels.

An alternate approach to electrically attaching the display module 1 to the printed circuit board bus 5 is to use standard connector sockets and pins (not shown). The display module 1 can have standard connector pins on its back side and the printed circuit board 5 can have standard connector sockets each with the appropriate number of contacts. Electrical contact between them is made by pushing the connector pins of the display module 1 into the connector sockets of the printed circuit board 5.

An alternate non-destructive and rapid means of mounting the printed circuit board bus 5 to the shelf edge channel 2 is to use spring clips or screw-adjustable clips (both not shown) that are attached to the printed circuit board 5. Store shelf edge channels 2 have external grooves or lips to which flexible spring clips can be designed to snap into these grooves and produce a secure connection. Screw-adjustable solid clips have a slot with a securing screw to allow the clip to be raised or lowered into the channel groove (not shown). The securing screw is tightened after adjustment to secure the clip. Different spring clips and screw adjustable solid clips can be designed for the different types of shelf edge channels 2 that can be encountered in a store.

The various printed circuit boards 5 in each of the shelf edge channels 2 of the various shelf sections 3 on one side (designated 41 in FIG. 7) of a row (designated 54 in FIG. 7) can be electrically interconnected by the use of sets of standards connection posts (not shown) on each end of the printed circuit board 5. The posts or pins (not shown) are electrically connected to the traces 20 of the board 5 and protrude vertically from the board 5 surface. Two sets of pins at each end of the printed circuit board 5 can allow any arrangements of shelf sections 3 to be interconnected. Interconnection is achieved by the use of standard flat ribbon cable (not shown) jumper-assemblies. Standard push-in ribbon cable end connectors (not shown) with snap-in locks can be used to secure the ribbon cable connection. The use of a secure connector prevents the jumper cable (not shown) from being disconnected by a casual or accidental contact by a customer. In this manner all of the printed circuit board buses 5 in the shelf sections 3 of an entire side (designated 41 in FIG. 7) of a row (designated 54 in FIG. 7) can be connected to the BUSM (designated 39 in FIG. 6) by one bus cable (designated 40 in FIG. 7).

Figure 6:
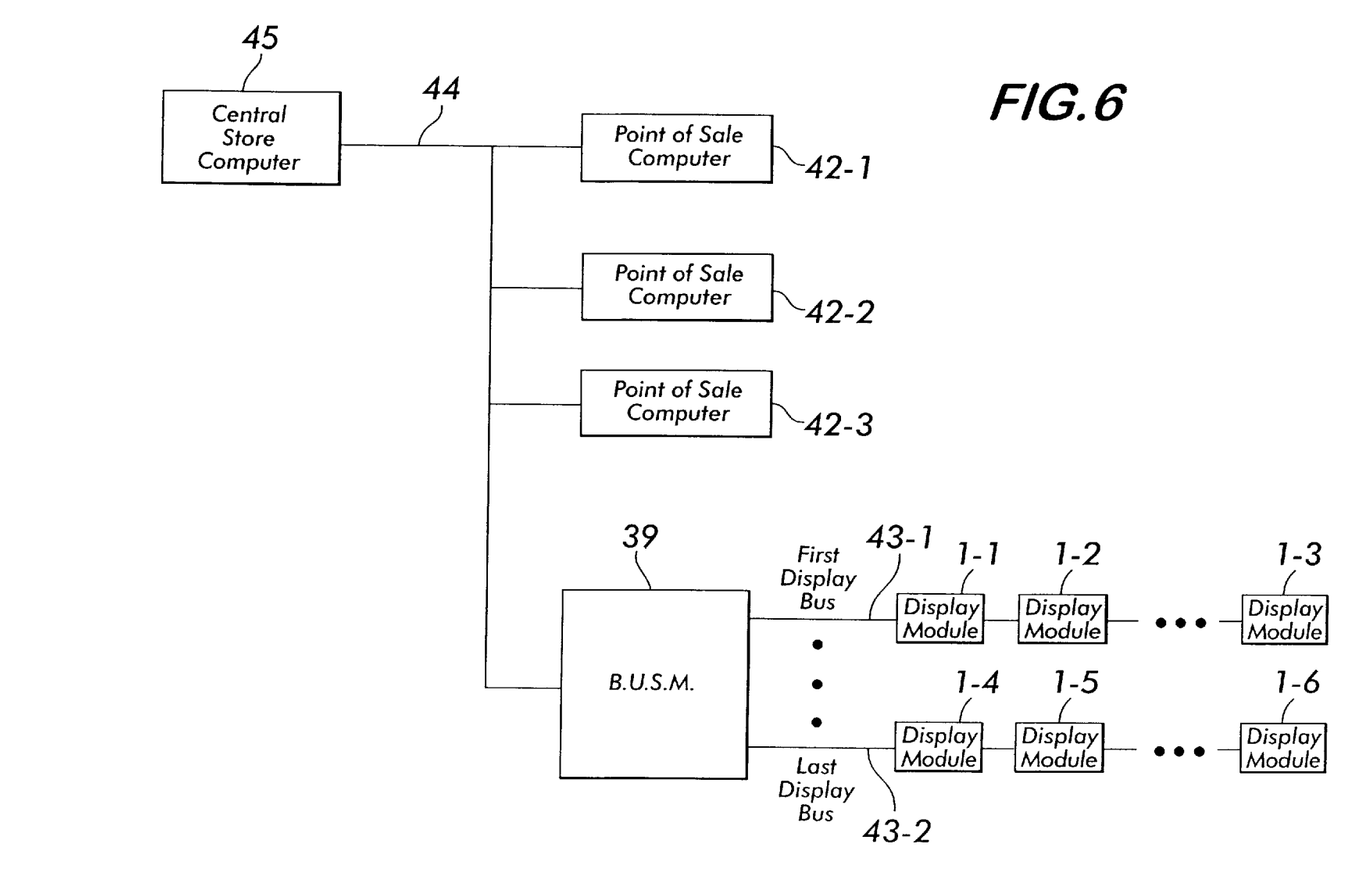
FIG. 6—is a block diagram illustrating the interconnection and information flow between the central store computer, the point of sale computers, the BUSM, the store display buses, and the display modules.

One of the objects of the present invention is to make each electronic display module 1 as simple electronically as possible. This is accomplished with the BUSM 39 as shown in FIG. 6. The BUSM 39 provides an information exchange link between the high-speed computer bus 44, serial or parallel, of the store computer 45 and the low speed (less than 10 kHz) signal port (designated 50 in FIG. 8) of the display modules 1. The use of a serial or parallel bus 44 by the store computer 45 will affect the type of software needed by the BUSM 39 to allow communications with the store computer 45. FIG. 6 is a simplified block diagram of the overall new electronic display system and its interfaces with the standard central store computer 45, point of sale computers 42-1 to 42-3, the display modules 1, and display buses 43-1 to 43-2. The BUSM 39 accepts the cost and product information in much the same manner as the point of sale computers 42-1 to 42-3. The BUSM 39 then processes the product information for transmission to the electronic display modules 1-1 to 1-6. The BUSM 39 insures that the product cost information is distributed and sent to the correct display bus 43 and to the correct display module 1 which is displaying the information of the intended product 4.

Figure 7:
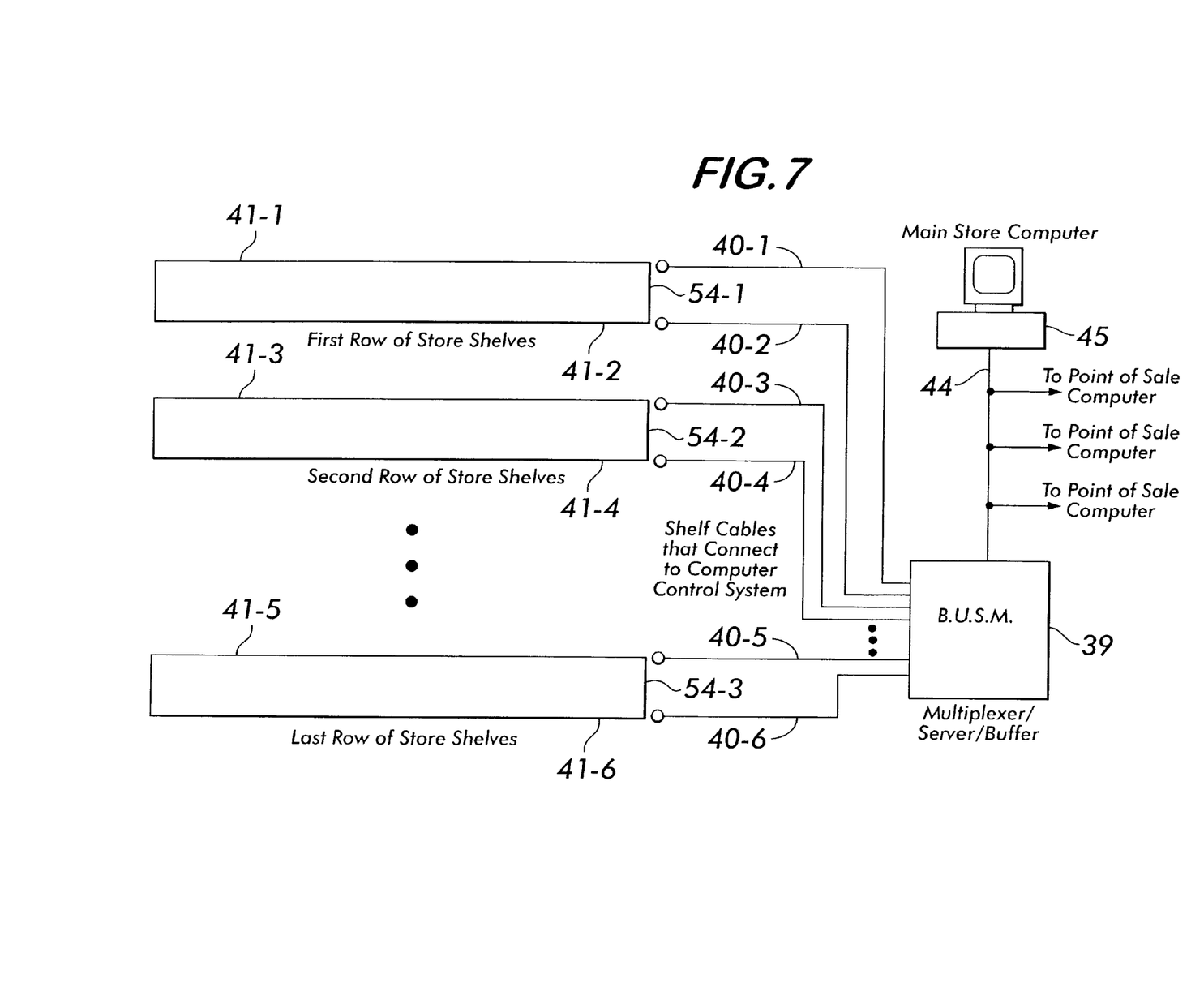
FIG. 7—is a block diagram showing the information flow and electrical interconnection between the BUSM, the main store computer, and the printed circuit board buses in each side of each row of store shelves.

FIG. 7 shows the electrical interconnection between the BUSM 39, the store computer 45, the display bus cables 40-1 to 40-6, and the store shelf rows 54-1 to 54-3, and the sides 41-1 to 41-6 of the rows. In FIG. 7 there is a display bus 43 and display bus cable 40 for each side 41 of all of the rows 54 of store shelves.

The BUSM 39 unit not only provides a DC power bus (designated 38 in FIG. 9) to the display units 1 but also acts as a buffer, server, and multiplexer in that it provides a two way communication link to the various display modules 1 located in all of the rows 54 of the store shelves. The BUSM 39 routes the information or item changes sent by the store computer 45 to the proper display bus group 43 or segment, i.e., the particular shelf row 54 and side 41, and to the proper display module 1 located in the segment or display bus 43. In this approach each side 41 of a row 54 has a dedicated display bus 43. The information to be sent to a particular display module 1 is determined by the address code affixed to the information by the BUSM 39. Since each side 41 of a shelf row 54 is independently connected to the BUSM 39, the number of address codes needed is limited to the number of display modules 1 that can be assigned to a single side 41 of a store row 54, i.e., to the display bus 43. The address codes can be repeated for each side 41 of a store row 54, i.e., for each display bus 43. The BUSM 39 can determine to which shelf side 41 and shelf row 54, i.e., to which display bus cable 40, the information is to be sent. The number of address codes that are needed for the display modules 1 on a particular side 41 of a row 54 of shelves can be found as follows. In a typical store there could be 10 to 16 rows 54 of shelves. Each side 41 of a shelf row 54 consists of four-foot long shelf sections 3 (or three-foot long sections depending on its location) of sub-shelves and each section 3 has a shelf edge channel 2. There are typically 6 to 7 layers of these shelf sections 3 from the top to the bottom of the shelf side 41 and there can be up to 19 to 20 groups of shelf sections 3 across the horizontal expanse of the side 41 of a row 54. Also, there can be 4 to 6 items 4 per shelf section 3. This implies that there can be as many as (20×7×6) or 840 separate. items 4 per side 41 of a row 54. Consequently, no more than 1,024 separate address codes are needed for the display modules 1 on a side 41 of a row 54 of the store shelves and consequently for each display bus 43. Each address code can be represented by a 10 bit binary (digital) word consisting of 1's and 0's. The address codes can be repeated on different rows 54 of shelves: since the BUSM 39 can differentiate display modules 1 with the same code by the particular shelf side 41 and row 54 in which the display modules 1 are located. In addition, clock speed rates can be below 10 kHz for any particular display bus 43. The BUSM 39 can send the display information simultaneously to all of the shelf rows 54 using parallel processing. This allows the rapid change of displayed information throughout a store and will allow the use of low clock speeds. With this approach, the Part 15FCC requirements for computing devices will not apply to that part of the electronic bus display system located between the BUSM 39 and the rows 54 of store shelves.

In that situation in which the number of items 4 exceeds the maximum number of address codes in a particular side 41 of a row 54, 1,024, the side can be partitioned. A separate display bus 43 can then serve each of the two partitions.

Figure 8:
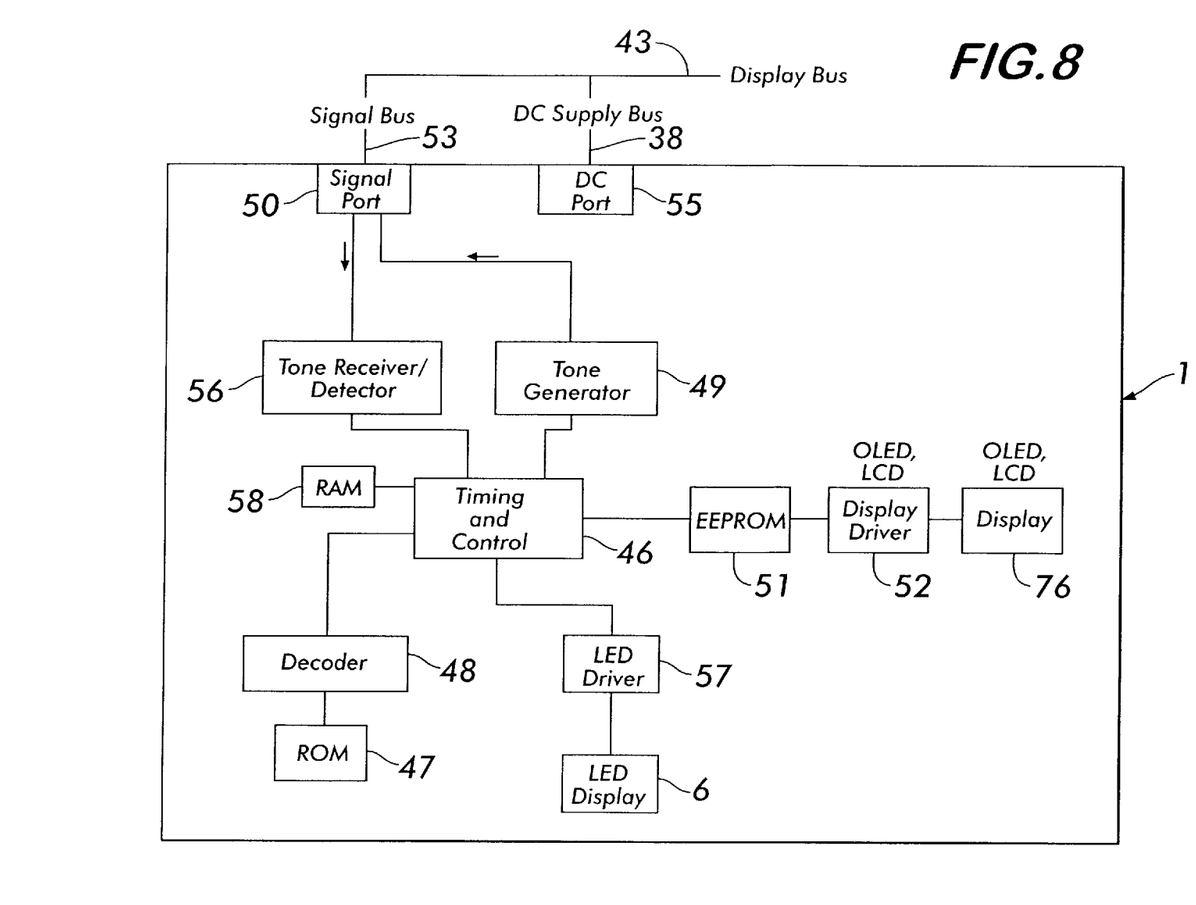
FIG. 8—is a block diagram of the display module showing its constituent electronic subsystems and its electrical connections to the display bus.

The block diagram of the electronic subsystems that make up the display module 1 is shown in FIG. 8. The display bus 43 consists of both a DC supply bus 38 and a signal bus 53. Each display unit 1 has a signal port 50 and a DC port 55. The new product information is processed and received in the following manner. First, the BUSM 39 sends out the 10 bit address code as a series of different frequency tones on the signal bus 53. In one such scheme one tone represents a digital "1" and a second tone of different frequency can represent a digital "0". The frequency tones are received, detected and converted to digital, (binary) signals by the Tone Receiver/Detector unit 56. The Timing and Control module 46 then compares the received address code signal to the internal code stored in its ROM 47 by the use of the Decoder 48. The RAM unit 58 consists of random access memory that the Timing and Control module 46 needs to process and route the information. If there is a match of address codes, an acknowledgement signal is then sent to the BUSM 39 using the Tone Generator 49. Once the BUSM 39 receives the acknowledgement signal, the BUSM 39 then sends on the signal bus 53 the information to be displayed using the same two tone method of encoding address code information as described above. The display information, once received by the display module 1, is then sent to a non-volatile programmable memory, EEPROM 51. This digital information is then sent to the Display Driver 52 and then to the Display 76 itself. Once the display information is received, it is resent to the BUSM 39 as final check that the proper information has been received and displayed by the display module 1. The Display 76 can use either liquid crystal devices (LCD) or organic light emitting diodes (OLED). Special sales information is announced by the use of a flashing LED Display 6 and the LED Driver 57. This can be activated by receiving a special digital word sent by the BUSM 39 using digitally encrypted tones. Once such transmission scheme is as follows. In the range of the allowable band of use, 1 kHz to 10 kHz, five tones can be selected, 1 kHz, 3 kHz, 5 kHz, 7 kHz, and 9 kHz. Each tone can be changed at a 1 kHz or 2 kHz rate. In one such embodiment, 3 kHz and 5 kHz can be used for address code transmission and 7 kHz and 9 kHz can be used for display information transmission. The 1 kHz tone can be used for activating the sales alert light 6. Certainly many other signaling schemes are possible.

A further object of the present invention is to provide a system in which the display module 1 is as simple electronically as possible. A major drawback of the prior art has been the complexity and resulting expense of the display modules 1. Tens of thousands of these items may be needed to instrument all of the items 4 in a store. The current design extends the state-of-the-art by requiring the use of a display module 1 that is extremely simple and inexpensive. This is accomplished by the unique design imbedded in the electronic BUSM 39 system that interfaces with the store central computer 45 and the display modules 1. The BUSM 39 acts as a data buffer, information server, driver, and multiplexer and has been designated as the BUSM 39 which is an acronym for Buffer, Server, and Multiplexer. Each store item 4, and information to be displayed is stored in the store main computer 45. Upon initiating a change to the displayed information of a particular item, the store computer 45 sends the new display information to the BUSM 39 over one of its standard highspeed interface buses (serial or parallel) 44. The BUSM 39 has product information stored in its memory (designated 59 in FIG. 9). Included in this information is the particular row 54 and side 41 of the store shelves where an item 4 is located and the internal address code of the item 4. The BUSM 39 stores the product change information from the store computer 45 and processes it. It decodes the information to determine the row 54 and side 41 locations of the item 4 to be changed. It then routes the information to the correct data line or cable 40 that is connected to that particular side 41 and row 54, i.e., the correct display bus 43. It then sends the new information to the display module 1 by using its particular address code.

The signal from the BUSM 39 to the display module 1 is a low frequency signal comprised of a series of tones with frequencies less than 10 kHz. The signal format between the BUSM 39 and display modules 1 can also be modulated tones, pulsed tones, or switched tones. In either case, the tones, pulse rates or switching rates in combination must be less than 10 kHz. In this manner the part of the new system from the BUSM 39 to the display modules 1 does not need to meet the Part 15 FCC requirements for computing devices. This part of the overall system includes the cables 40 or data lines that are networked in the store, the display modules 1, and the printed circuit board buses 5.

Whichever of the above signaling systems is employed, the display modules 1 require the same type of signaling system as the BUSM 39. The BUSM 39, after sending a signal with the new display information, waits for a confirmation or acknowledgement signal from the display module 1. In this manner there is an interaction between them. The BUSM 39 keeps track of all the successful and unsuccessful transfers of information to the display modules 1 and sends a report back to the store computer 45. In this manner, any potential display module 1 failures or maintenance problems can be reported to the store computer 45 for action to be taken later. The BUSM 39 sends all changes to the display modules 1 one at a time for a particular side 41 of a row 54 until all changes to that side 41 have been completed. The BUSM 39 performs this operation simultaneously for all of the sides 41 of all of the rows 54. In this manner, all display buses 43 are being processed and changed in parallel at the same time. This reduces the amount of time it takes to change all of the designated display modules 1 in the store. The total change process is not complete until the BUSM 39 has received acknowledgement signals from all of the display modules 1 that had to be changed. The BUSM 39 is programmed to attempt a display change in a limited number of tries. If no acknowledgement signal is received from the addressed display module 1 within the limited number of attempts, then the display module 1 is flagged as having a potential malfunction. The BUSM 39 then signals the next display module 1 to be changed until all of the modules 1 to be changed have been addressed. This approach limits wasted processing time.

Figure 9:
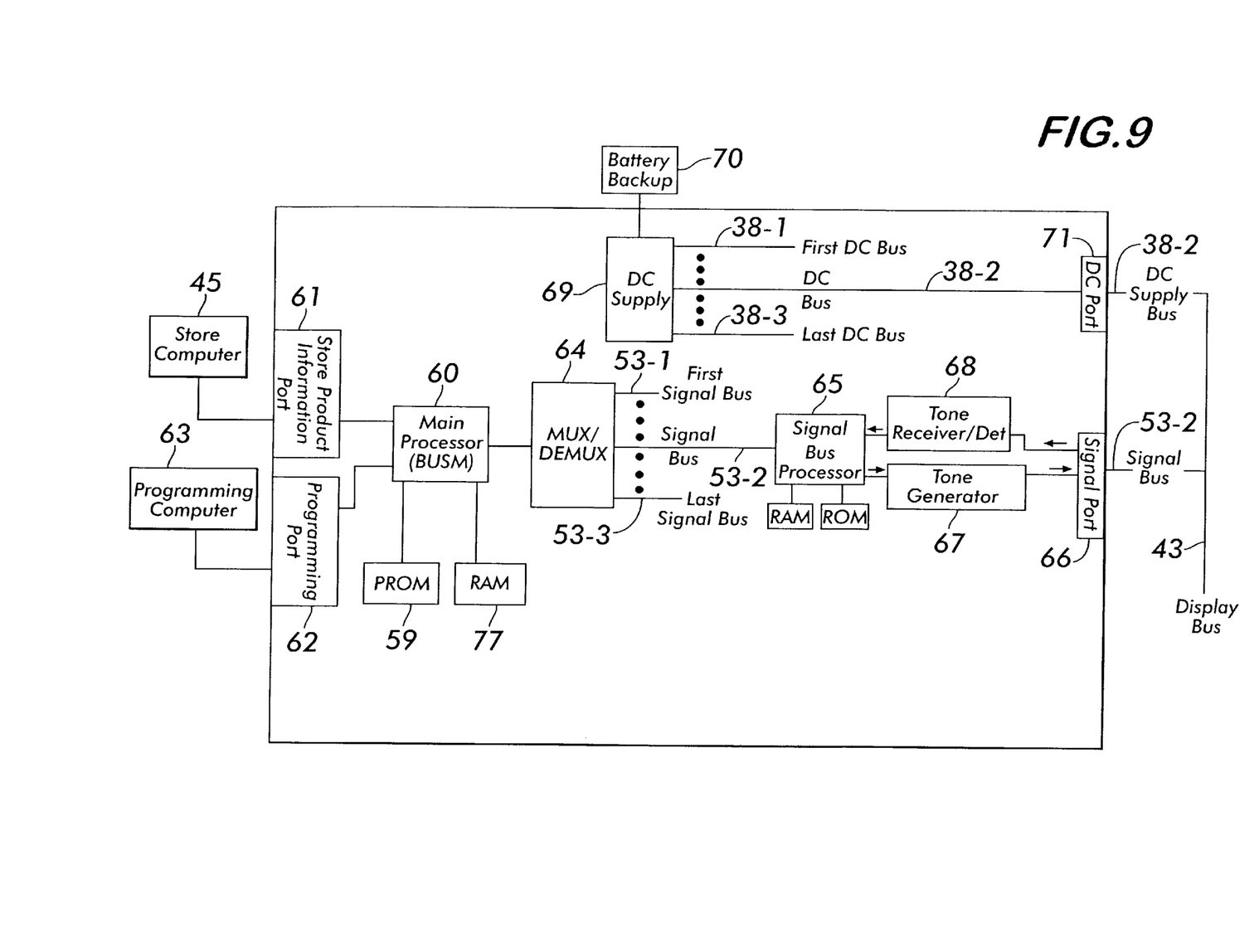
FIG. 9—is a block diagram of the BUSM showing its constituent electronic subsystems and its electrical connections to the signal and DC buses, the store computer, and a programming computer.

The detailed block diagram of the electronic subsystems that contitute the BUSM 39 is shown in FIG. 9. The BUSM 39 has a Main Processor 60, a Programmable Memory (PROM) 59, and a RAM unit 77 that has random access memory needed for processing information. The Main Processor 60 receives the information to be changed from the store computer 45, through the Store Product Information Port 61. There is also a Programming Port 62 to allow access to the BUSM 39 from a separate Computer Programming Workstation 63. The Programming Port 62 is used to enter product location information and product address code information into the PROM 59 unit of the Main Processor 60. The information loaded into the BUSM Processor 60 includes the particular side 41 and row 54 that an item 4 is located. This information must be updated every time a new item 4 is added, an existing item 4 is moved to a different side 41 of a row 54, or a display module 1 with a different address code is to be used with the item 4. Software is needed to allow communication between the Programming Computer Workstation 63 and the Main Processor 60. In this way the Main Processor 60 can send the product information to the correct display bus 43. The particular address code of the product is also loaded into the processor memory, PROM 59. The address code of a particular product is dependent upon which of the 1,024 different display codes and its associated display module 1 is to be used with the product. This decision is arbitrary but once selected and defined it will always be associated with the particular product on that side 41 of the row 54 unless changed by the store. The particular side 41 and row 54 a product is located is totally at the discretion of the store. Once product information is received by the Main Processor 60 from the store computer 45, it can encode the information with the proper signal bus address such that the MUX/DEMUX unit 64 can send it to the correct signal bus 53. The MUX/DEMUX unit 64 performs a multiplexing operation by receiving information from the Main Processesor 60 and sending it to the correct signal bus 53 using the signal bus address code affixed to the information. Similarly, information sent from the Signal Bus Processor 65 to the Main Processor 60 is de-multiplexed into a single serial information stream to the Main Processor unit 60. Each display bus 43 receives the address codes of the display modules 1 to be changed as well as the information to be changed for each display module 1. Each signal bus 53 has its own Signal Bus Processor 65. The Signal Bus Processor 65 stores the display codes and product information and then processes it. It first sends out address information using the two-tone encoding technique described earlier and then sends out display information in the same manner. The Signal Bus Processor 65 sends information over the signal port 66 using the Tone Generator Module 67 to generate the proper set of tones. Once the display address is sent out and an acknowledgement signal is received, the display information is sent to the display module 1. The display module 1 then retransmits the received information to the Signal Bus Processor 65. The Signal Bus Processor 65 then compares the sent information to the received information as a means of validating the displayed information in the display module 1. The signal from the display module 1 is received, detected, and converted to digital signals by the Tone/Receiver/Detector Unit 68. If there is a discrepancy in sent versus displayed information, the Signal Bus Processor 65 flags the display unit 1 and, sends a malfunction report to the Main Processor 60. The Main Processor 60 reports all successful and failed transmissions to the store computer 45 for future action. However, once a successful transfer of information to a display module 1 has occurred, the next display module 1 to be changed is then processed. In this manner, all display modules 1 that are to be changed on a particular display bus 43 are processed. This operation is performed in parallel with all of the other display buses 43. The Signal Bus Processor 65 performs most of the signal processing and this allows the display module 1 to have a minimum of complexity and hence low cost. The signaling scheme of the Signal Bus Processor 65 must be identical to that of the display module 1 and hence will use frequencies and data rates less than 10 kHz.

The BUSM 39 also has a DC power supply 69 which provides power to all of the display modules 1 through DC Port 71 to the DC Supply Bus 38. All display modules 1 have a non-volatile memory (EEPROM) 51 that will retain the display information in the event of a power failure. However, a Battery Backup 70 can be included which can provide power to the DC Supply Bus 38 during a power failure.

Figure 10:
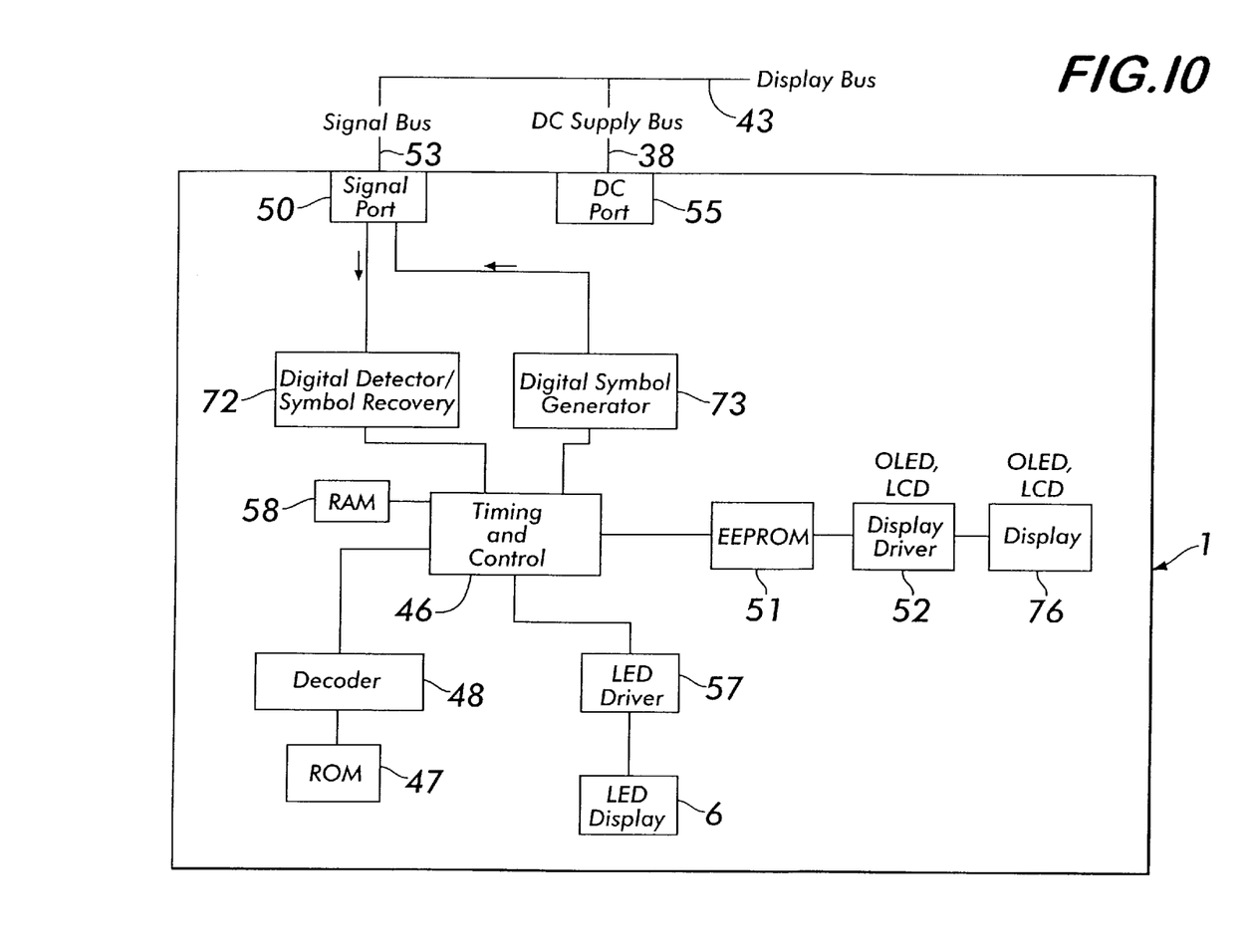
FIG. 10—is a block diagram of the display module showing its constituent electronic subsystems when conventional digital signals are used in the signal bus.

An alternate signaling method is to use standard digital or binary signals on the signal bus 53. In FIG. 10 is a block diagram of the electronic subsystems of the display module 1 using standard digital signals on the signal bus 53. Only two modules are different from FIG. 8, the Digital Detector/Symbol Recovery module 72 and the Digital Symbol Generator 73. The Digital Detector/Symbol Recovery module 72 detects the presence of binary signals on the signal bus 53 through the signal port 50 and reconstructs or recovers the transmitted digital signal and sends the signal to the Timing and Control module 46. The Digital Symbol Generator module 73 contains digital signal generation and drive circuits and produces digital signals for transmission over the signal bus 53. All other subsystems operate as described previously.

Figure 11:
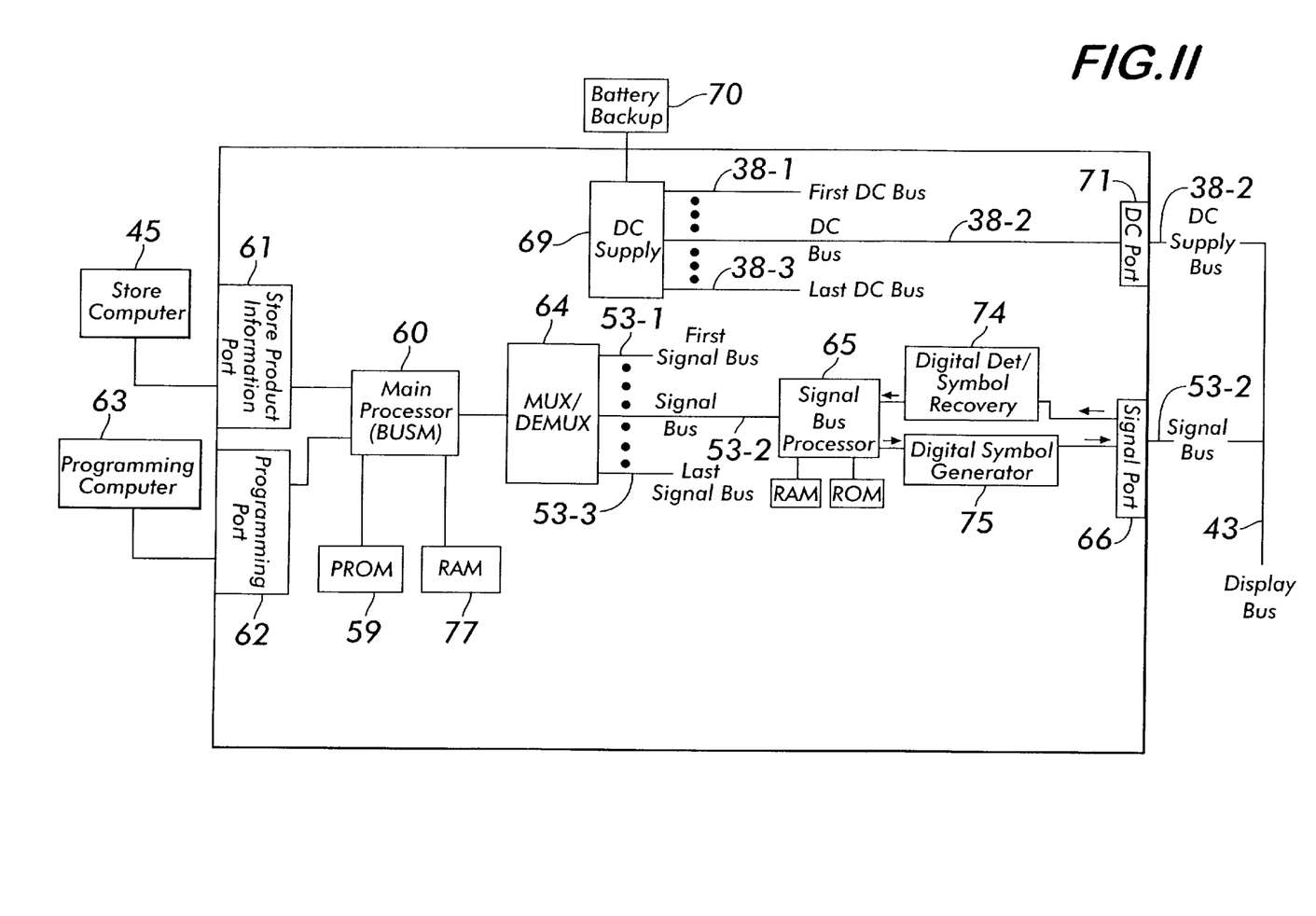
FIG. 11—is a block diagram of the BUSM showing its constituent electronic subsystems when conventional digital signals are used in the signal bus.

In FIG. 11 is a block diagram of the electronic subsystems of the BUSM unit 39 using standard digital signals on the signal bus 53. Only two of the modules are different from FIG. 9, the Digital Detector/Symbol Recovery Module 74 and the Digital Symbol Generator Module 75. These two modules function in the same manner as those for the display module 1 as described above. All other subsystems operate as described previously.

While preferred embodiments of the present invention have been illustrated in detail, it is apparent that modifications and adaptations of the preferred embodiments will occur to those skilled in the art. However, it is to be expressly understood that such modifications and adaptations are within the spirit and scope of the present invention as set forth in the following claims.

What is claimed is:

1. An electronic display module for electronically displaying item data provided in updatable form by a computer, said display module comprising:

a multiple tone frequency receiver and detector for receiving message data transmitted by said computer;

a timing and control logic circuit coupled to the tone detector for routing, transferring and controlling received message data by said tone detector;

a random access memory coupled to said timing and control logic circuit for storing message data from the computer;

a read only memory for storing the address code of said display module;

a decoder coupled to said read only memory being adapted to determine if address code stored in the read only memory is contained within the message received from said computer;

means for electrically connecting said display module to electrical power and signal buses;

a second memory coupled to said timing and control logic circuit, said second memory storing the item data provided by said computer when said local address code matches said transmitted address code, said second memory being nonvolatile such that item data is retained in the event of loss of external power;

a display driver and electronic display means coupled to said second memory for visually displaying item data provided by said computer; and a tone frequency generator coupled to said control and timing logic for generating and transmitting a display module message to said computer.

2. The apparatus of claim 1 wherein said message signal rate for reception and transmission of item data by switched multiple tone frequencies where each switched tone frequency is less than a frequency of 10 kHz.

3. The apparatus of claim 1 wherein said contact means for electrically connecting said display module to the electrical power and signal buses is a connector housing having contact pins.

4. The apparatus of claim 1 wherein said contact means for electrically connecting said display module to electrical power and signal buses are contact springs with guide posts having outer protective flexible rubber boots.

5. The apparatus of claim 1 wherein said signaling means for transmission and reception of item data information over the signal buses is such that the arithmetic sum of the tone frequency and the data rate is less than a frequency of 10 kHz.

6. The apparatus of claim 1 further including display control means for the sequential automatic, non-manual presentation of multiple display information.

7. The apparatus of claim 1 wherein the display module message transmitted to the computer is formed by encoding and re-modulating the display information received from the computer.

8. An electronic interface device that receives item data information from a main computer, stores and processes the item data and transmits processed item data to display modules comprising:

an item information input port for receiving item data from a main store computer;

a programming input port for receiving item information data including location, bus display signal address, item address code of a display module associated with a specific item, and item signature data;

a main processor coupled both to said item information input port and a programming input port for processing said item signature data and said item information data;

a programmable memory coupled to said main processor for storing item signature data including universal bar codes, signal bus addresses, and item addresses;

a random access memory coupled to said main processor for temporary storage of processed information;

a multiplexer/demultiplexer unit for decoding simultaneous signals of different frequency coupled to said main processor for routing, distributing, and transferring item data information to and from the main processor; and a plurality of signal bus processor units coupled to the multiplexer/demultiplexer unit for processing, storage, transmission and reception of item data information to and from item display modules through the signal buses, and to and from the main processor.

9. The apparatus of claim 8 further including a tone generator coupled to the signal bus processor for generation of multiple tone frequencies switched from one frequency to another transmitted over the signal bus to the display modules, and a tone receiver and detector coupled to the signal bus processor for reception of multiple tone frequencies switched from one frequency to another over the signal bus from the display modules.

10. The apparatus of claim 9 further including a DC supply unit coupled to the DC supply buses which provide electrical power to the display modules.

11. The apparatus of claim 10 wherein said DC supply unit is electrically coupled to a battery backup unit to provide power to display modules in the event of a loss of power.

12. The apparatus of claim 11 wherein said signaling means for transmission and reception of item information over the signal bus is a digital symbol comprising binary signals.

13. The apparatus of claim 8 wherein said message signaling rate for reception and transmission of item data information over the signal bus is such that the arithmetic sum of the tone frequency and the data rate is less than a frequency of 10 kHz.

14. The apparatus of claim 13 wherein said signal bus processor transmits to the main processor a record of all successful and unsuccessful transmissions of item display information sent to the display modules.

15. The apparatus of claim 8 wherein said input port for receiving item data from a main computer receives both serial and parallel data bus information.

16. The apparatus of claim 15 wherein said main processor transmits to the main computer a record of all successful and unsuccessful item display information updates, transmissions, and receptions.

17. The apparatus of claim 8 wherein said signal bus processor receives acknowledgment signals and displayed information signals from display modules formed from the encoding and demodulation of the displayed information, said signals confirming correct reception of displayed item information.

18. A computer driven system for displaying and updating item pricing, descriptive, and sales information, said system comprising:

a plurality of printed circuit board buses comprising:
means to mechanically connect to shelf edge channels and means for mounting a plurality of display modules;
a plurality of electrical contacts on said circuit board buses electrically connected to said display modules, means to electrically interconnect all similar electrical contacts on the said printed circuit board buses; and means to electrically interconnect all printed circuit board buses residing in different edge channels.

a plurality of display modules positioned adjacent to selected item locations in said shelf edge channels, each of said display module comprising:

means for receiving transmitted signals over a dedicated signal bus, said signals containing address code and pricing information;
memory means for internally storing a local address code for each display module and for comparing a received address code with said local address code;
display means for electronically displaying and storing item pricing information and descriptive information when said local address code matches said transmitted address code; and
means for transmitting acknowledgment and display information signals over the dedicated signal bus, an electronic interface device connected between a main computer and said circuit board buses for receiving item data information from a main computer, for storing and processing the item data and then transmitting the processed item data to said display modules over a dedicated signal bus, said interface device including an item information input port and a programming input port, and further including a main processor for storing and processing item information received from both the store main computer input port and the programming input port; and a plurality of signal bus processors for processing, storage, transmission, and reception of item data information to and from the display modules through the signal bus, comprising;
a multiplexer and demultiplexer unit for routing, distributing and transferring item data information between the main processor and the signal bus processor using signal bus address codes; and
a DC supply unit to provide DC electrical power to the display modules through the DC supply buses.

19. The system according to claim 18 comprising additionally a battery backup unit to provide power to display modules in the event of a power disruption.

20. The system according to claim 18 wherein said signaling means for transmission and reception of information over the signal bus is a binary signal.

21. The system according to claim 18 wherein said message signaling rate for reception and transmission of item data information over the signal bus is such that the arithmetic sum of the tone frequency and the data rate is less than a frequency of 10 kHz.

22. The system according to claim 18 wherein said signaling means for transmission and reception of information over the signal bus consists of the generation and detection of switched multiple tone frequencies.

23. The system according to claim 22 further comprising signal bus processor means for transmitting to the main processor a record of all successful and unsuccessful transmissions of item display information sent to the associated display modules.

24. The system according to claim 18 wherein said signals are tone frequencies less than a frequency of 10 kHz.

25. The system according to claim 24 further comprising main processor means for transmitting to the main computer a record of all successful and unsuccessful item display information updates, transmissions, and receptions.

26. The system according to claim 18 further comprising signal bus processor means for receiving acknowledgment signals and displayed information signals from the display modules and means to confirm the correct reception of displayed item information.

27. An electronic display module for electronically displaying item data provided in
updatable form by a computer, said display module comprising:

a multiple tone frequency receiver and detector for receiving message data transmitted by said computer;

a timing and control logic circuit coupled to the tone detector for routing, transferring and controlling received message data by said tone detector;

a random access memory coupled to said timing and control logic circuit for storing message data from the computer;

a read only memory for storing the address code of said display module;

a decoder coupled to said read only memory being adapted to determine if address code stored in the read only memory is contained within the message received from said computer;

means for electrically connecting said display module to electrical power and signal buses;

a second memory coupled to said timing and control logic circuit, said second memory storing the item data provided by said computer when said local address code matches said transmitted address code, said second memory being nonvolatile such that item data is retained in the event of loss of external power;

a display driver and electronic display means coupled to said second memory for visually displaying item data provided by said computer;

a multiple tone frequency generator coupled to said control and timing logic for generating and transmitting a display module message to said computer; and wherein said contact means for electrically connecting said display module to electrical power and signal buses are contact springs with guide posts having outer protective flexible rubber boots.

* * * * *